US008149959B1

(12) United States Patent
Varnica et al.

(10) Patent No.: US 8,149,959 B1
(45) Date of Patent: *Apr. 3, 2012

(54) ENHANCEMENTS OF SOFT DECODERS AND DETECTORS ON ASYMMETRIC CHANNELS

(75) Inventors: Nedeljko Varnica, Sunnyvale, CA (US); Seo-How Low, San Jose, CA (US); Gregory Burd, San Jose, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,407

(22) Filed: Jan. 24, 2011

Related U.S. Application Data

(63) Continuation of application No. 11/893,810, filed on Aug. 17, 2007, now Pat. No. 7,876,860.

(60) Provisional application No. 60/823,437, filed on Aug. 24, 2006.

(51) Int. Cl.
  *H04L 27/06* (2006.01)
(52) U.S. Cl. .................................................. 375/340
(58) Field of Classification Search .............. 375/259, 375/262, 316, 340, 341, 342, 343; 714/6, 714/746, 751, 761, 762; 348/466
See application file for complete search history.

(56) References Cited

U.S. PATENT DOCUMENTS

| | | | | |
|---|---|---|---|---|
| 5,621,764 | A * | 4/1997 | Ushirokawa et al. | 375/317 |
| 6,966,024 | B2 * | 11/2005 | Park | 714/780 |
| 7,380,193 | B1 * | 5/2008 | Shalvi | 714/746 |
| 7,424,071 | B2 | 9/2008 | Allpress et al. | |
| 2005/0204271 | A1 | 9/2005 | Sharon et al. | |
| 2006/0248435 | A1 * | 11/2006 | Haratsch | 714/784 |
| 2007/0019752 | A1 | 1/2007 | Kim | |
| 2007/0206696 | A1 | 9/2007 | Su | |

OTHER PUBLICATIONS

Thomas J. Richardson, et al, "The Capacity of Low-Density Parity-Check Codes Under Message-Passing Decoding", IEEE Transactions on Information Theory, vol. 47, No. 2, Feb. 2001.

* cited by examiner

*Primary Examiner* — Sam K Ahn

(57) ABSTRACT

Systems and methods for enhancing soft decoders and detectors on asymmetric channels are provided. The methods include acquiring log-likelihood ratios (LLRS) for error-correction code (ECC) encoded data symbols, selecting a quality measure function and a quality threshold based on the LLRs, applying the selected quality measure function to the LLRs to obtain quality measures, comparing the quality measures to the selected quality threshold, and updating the LLRs for selected ECC encoded data symbols based on the comparisons. The updating may occur by multiplying the LLRs for the selected ECC encoded data symbols by a selected scaling factor.

20 Claims, 12 Drawing Sheets

ENHANCEMENTS OF SOFT DECODERS AND DETECTORS ON ASYMMETRIC CHANNELS

CROSS REFERENCE TO RELATED APPLICATIONS

This application is a continuation of U.S. application Ser. No. 11/893,810, filed Aug. 17, 2007, which claims priority under 35 U.S.C. §119(e) to U.S. Provisional Application No. 60/823,437 filed Aug. 24, 2006. The disclosures of the applications referenced above are incorporated herein by reference.

BACKGROUND OF THE INVENTION

Embodiments of the invention generally pertain to systems and methods for processing data. In particular, embodiments of the invention pertain to systems and methods for the soft detection and soft decoding of data.

Data transmitted in communication systems or data written in data storage systems is often subject to errors. Errors may occur for a number of reasons, including, for example, noise or interference in data transmission, defects in a data storage medium, and/or other reasons. Thus, the data received in such systems is inevitably a distorted version of the transmitted or written data. Some communication or data storage channels are subject to errors which are dependent on the data symbol being transmitted. In other words, the statistics, such as the mean and variance, of the noise corrupting the signals corresponding to the data symbols are different. Such channels are known as asymmetric channels.

One device that can be used to detect errors on an asymmetric channel is a channel detector. Channel detectors can act as a preprocessor of received data for error correcting devices known as decoders. Two types of channel detectors are hard detectors and soft detectors, and two types of decoders are hard decision decoders and soft decision decoders. Hard detectors receive a sequence of bits from a channel and output hard decision data. These hard decisions consist of data corresponding to the original encoded data symbols transmitted by the communications system. Hard decision decoders can then receive the hard decision data as input, and output decoded data symbols. On the other hand, a soft detector receives a sequence of bits from a channel and outputs soft decision data. These soft decisions consist of data that indicate the probability that the received encoded data are a particular data symbol, such as "0" or "1" in a binary system. Soft decision decoders can then receive the soft decision data as input, and output decoded data symbols.

In soft detectors and soft decoders used in systems with binary channels, the ratio between the probability of a bit being "0" and the probability of a bit being "1" is used as a compact soft decision. This ratio is known as the likelihood ratio. Taking the logarithm of the likelihood ratio gives the log-likelihood ratio, or LLR. LLRs are the one of the most commonly used representations of soft decisions in communication systems.

The accuracy of the LLRs produced by soft detectors suffers when the communication or data storage channel is an asymmetric channel. As a result, the output of soft decision decoders can contain numerous errors. Thus, there is a continuing interest in enhancing the error detection capabilities of soft detectors and the error-correction capabilities of soft decision decoders on asymmetric channels.

SUMMARY OF THE INVENTION

In accordance with the principles of this invention, systems and methods for the enhancement of soft detectors and decoders on asymmetric channels are provided. In general, the system and methods realize the enhancements by acquiring LLRs for a plurality of error-correction code (ECC) encoded data symbols, and updating the LLRs for selected ECC encoded data symbols.

Specifically, LLRs for ECC encoded data symbols are acquired. A quality threshold and a quality measure function are selected. The selection of the quality threshold may be dependent on the values of some or all of the acquired LLRs. The selected quality measure function is applied to the LLRs to obtain a set of quality measures. The quality measures may then be compared to the selected quality threshold. The LLRs for selected ECC encoded data symbols are updated based on the results of the comparisons. The selected LLRs may also be updated with a modification function. The modification function may multiply the selected LLRs by a scaling factor. The scaling factor may be selected based on the values of the acquired LLRs.

The enhancements may be provided in the context of a communication/data storage system. An encoder encodes ECC encoded data symbols, and passes on the resulting encoded data to a digital modulator. The digital modulator transmits the ECC encoded data symbols over a channel. A demodulator receives the encoded data and acquires log likelihood ratios for the ECC encoded data symbols. A channel detector/decoder pair performs one or more of the enhancements described above.

The systems and methods of the invention may be used to provide enhancements for communication/data storage systems with soft detectors and soft decoders. Additionally, the systems and methods of the invention may be used to provide enhancements for communication/data storage systems that transmit data over asymmetric channels.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION

The systems and methods of the invention generally relate to detecting errors associated with the communication and/or storage of data. In general, and as will be discussed in more detail below, such communication or data storage occurs on a channel, which refers to a medium on which a data-bearing signal is communicated and/or stored, as well as events that may physically affect the medium. Various aspects of a channel may corrupt data that is communicated or stored thereon, and the data recovered subsequent to communication or storage may be different from their intended values. Such differences are referred to as errors.

Some communication or data storage channels are subject to errors which are dependent on the data symbol being transmitted. In other words, the statistics, such as the mean and variance, of the noise corrupting the signals corresponding to the data symbols are different. Such channels are known as asymmetric channels.

Figure 1:
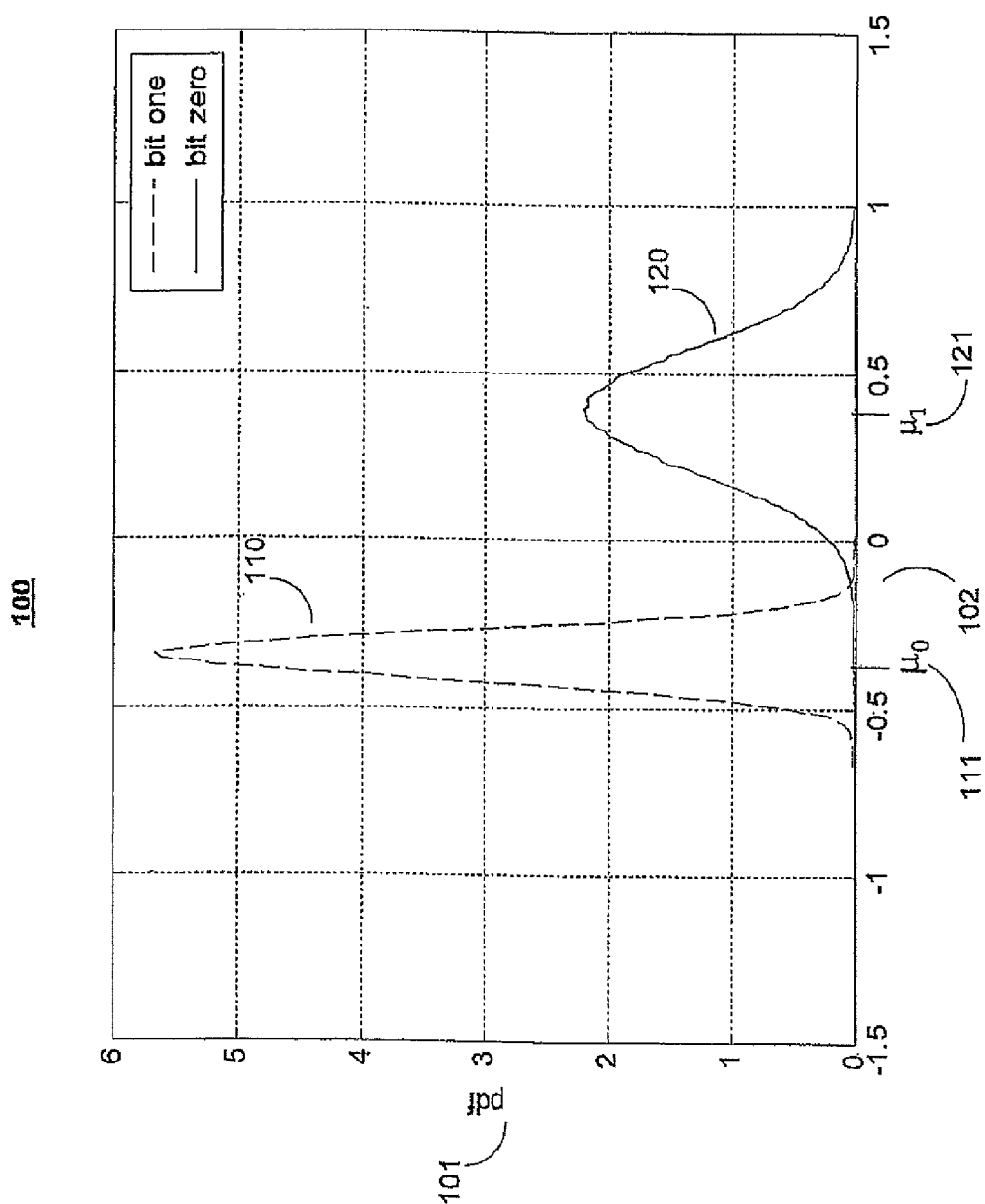
FIG. 1 shows an illustrative set of signal statistics for an asymmetric Gaussian channel.

FIG. 1 shows an illustrative set of noise components with asymmetrical signal statistics for an asymmetric Gaussian channel. Graph 100 displays the value of the channel's probability density function on its y-axis 101, and the value of the input to the probability density function on the x-axis 102. The signal statistics for the noise component corresponding to the bit "0" is shown as first probability density function 110. First probability density function 110 is Gaussian and has mean $\mu_0$ 111 and variance $\sigma_0^2$. The signal statistics for the noise component corresponding to the bit "1" is shown as second probability density function 120. Second probability density function 120 is Gaussian and has mean $\mu_1$ 121 and variance $\sigma_1^2$. Note that $\mu_0 \neq \mu_1$ and $\sigma_0^2 \neq \sigma_1^2$. [Note to inventor: The area under each curve does not appear to sum to 1, so the noise components are not true PDFs—If they are not meant to be PDFs, what do the x and y axis represent?]

In various embodiments, the asymmetric channel statistics depicted in graph 100 may include any number of probability density functions 110 and 120, including 1, 2, 3, 4, 5, 8, 10, 15, 20, 30, 40, 50, 75, 100, or more than 100 probability density functions corresponding to noise components of a similar number of data symbols. In addition, the probability density functions may depict the values of a uniform random variable, exponential random variable, geometric random variable, Poisson random variable, or any such suitable random variable that describes a random process.

The asymmetric signal statistics shown in graph 100 may be the signal statistics of a data communications channel, magnetic storage channel, holographic storage channel, or any suitable type of channel. The systems and methods described herein may be applied to asymmetric channels in general, and holographic storage channels in particular. In holographic storage systems, data may be arranged in an array or page of around a million bits. The pages may be organized into chapters, the chapters may be organized into books, and the books may be organized into volumes. To read the data that is written in a given volume from a holographic storage channel for a holographic storage system, a laser beam is deflected off of a hologram to produce a 3-D image which is a distorted version of the originally stored data. This 3-D image is then projected onto a detector that reads the data in parallel off of the holographic storage channel for the holographic storage system. This parallel read out of data provides the holographic storage channel with fast data transfer rates.

Figure 2:
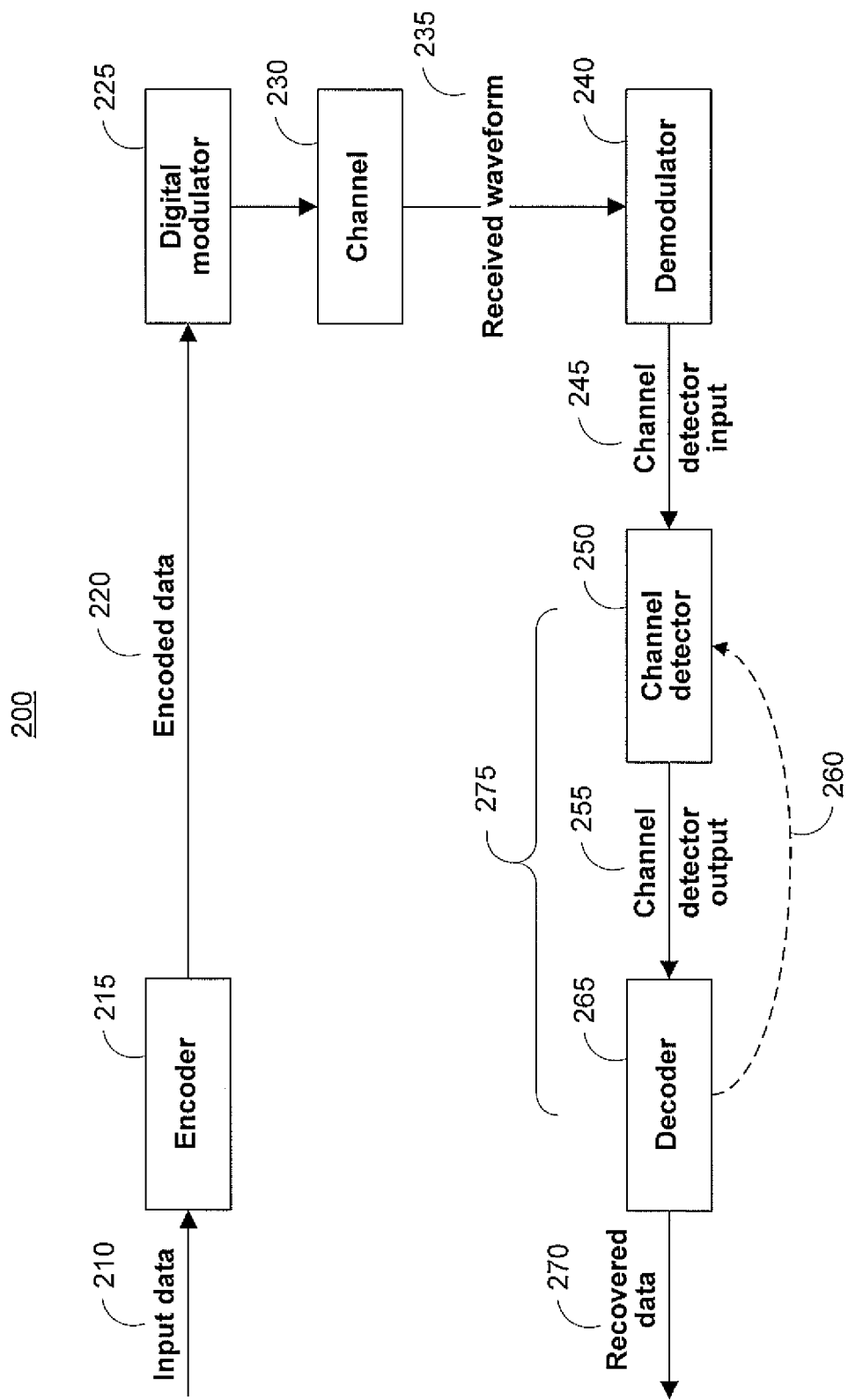
FIG. 2 shows an illustrative communication/data storage system that implements a method for enhancing the soft decoding/soft detection of data.

FIG. 2 shows an illustrative communication/data storage system 200 that implements the disclosed method for decoding/detecting data on asymmetric channels. Input data 210 is encoded through encoder 215. Encoding generally refers to the process of generating data in a manner that facilitates subsequent detection and/or correction of errors in the data, while decoding generally refers to the counterpart process of detecting and/or correcting the errors. Coded information can be grouped into units called codewords. Codewords may contain symbols, which are groupings of one or more pieces of data. Input data may be binary data, ternary data, quaternary data, or any other suitable type of data. In the process of encoding and decoding data, different codes can be used to encode data to achieve different results. One class of codes, called error-correction codes (ECC), may be used to detect and/or correct errors. Error correcting codes are often used to correct errors which may occur during transmission or storage. In the disclosed systems and methods, error-correction code-encoded (ECC-encoded) data symbols are processed.

Encoder 215 may encode data 210 using turbo codes, low-density parity check (LDPC) codes, or any other suitable error control code. The resulting encoded data 220 is passed to a digital modulator 225. Digital modulator 225 prepares encoded data 220 for transmission on channel 230. Channel 230 may be an asymmetric channel, such as that described with respect to FIG. 1. Digital modulator 225 may use frequency-shift keying, quadrature amplitude modulation, or any suitable digital modulation technique. A received waveform 235 is demodulated with demodulator 240. Demodulator 240 demodulates received waveform 235 with filters, multiplication by periodic functions, or any suitable demodulation techniques corresponding to the type of modulation used in digital modulator 225. Note that received waveform 235 may be subject to noise, and as a result may contain errors.

The resulting channel detector input 245 may be processed by channel detector 250. Channel detector 250 can be used to detect errors in channel detector input 245. Channel detector 250 may also preprocess channel detector input 245, and produce soft or hard detector output for decoder 265. Decoder 265 may then correct errors in the channel detector output 255. Channel detector 250 may be a hard detector or a soft detector. Decoder 265 may be a hard decision decoder or a soft decision decoder. Channel detector 250 and decoder 265 may be referred to collectively as a detector/decoder pair 275.

In one embodiment, channel detector 250 is a hard detector and decoder 265 is a hard decoder. Channel detector 250 receives a sequence of bits from demodulator 240 and produces channel detector output 255. Channel detector output 255 consists of hard decision data corresponding to the original encoded data symbols transmitted by the communications system. Hard decision decoder 265 receives the channel detector output 255 as input, and produces recovered data 270. Recovered data 270 may consist of decoded data symbols corresponding to the original input data 210.

In another embodiment, channel detector 250 is a soft detector and decoder 265 is a soft decoder. Soft decoder 265 receives a sequence of bits from the demodulator 240 and produces channel detector output 255. Channel detector output 255 consists of soft decision data. The soft decision data consists of data that indicates the probability that the received encoded data are a particular data symbol, such as "0" or "1". Decoder 265 receives the channel detector output 255 as input, and produces recovered data 270. Recovered data 270 may consist of decoded data symbols corresponding to the original input data 210.

In embodiments where channel detector 250 is a soft detector, decoder 265 is a soft decoder, and the encoded data 220 is binary, the ratio between the probability of a bit being "0" and the probability of a bit being "1" is used as a compact soft decision. This ratio is known as the likelihood ratio. Taking the logarithm of the likelihood ratio gives the log-likelihood ratio, or LLR. A positive LLR indicates that an encoded data symbol from encoded data 220 is likely to have the value 0, whereas a negative LLR indicates that an encoded data symbol from encoded data 220 is likely to have the value 1.

Encoder 215 and decoder 265 must operate efficiently as received waveform 235 is inevitably a distorted version of the data transmitted from digital modulator 225. In addition, channel detector 250 and decoder 265 may use a variety of detection and decoding algorithms. For example, the Viterbi algorithm is a well-known channel detection algorithm that utilizes a received sequence of bits from a channel to obtain hard decision data as output. Additionally, the soft-output Viterbi algorithm, or SOVA, is a well-known channel detection algorithm that utilizes a received sequence of bits from a channel to obtain soft decision data as output. Further, iterative decoding is a well-known decoding algorithm that utilizes either hard decision data or soft decision data to obtain decoded data symbols as output. Recent codes, such as turbo or low-density parity check (LDPC) codes, typically rely on iterative decoding. The detection and decoding algorithms may work together to ensure that the recovered data 270 is as free of errors as possible. For example, if the error-correction code used in communication/data storage system 200 is an LDPC code, than LLRs from the soft-output channel detector 250 may be fed to decoder 265 so that iterative decoding may be performed. Note that in embodiments where channel detector 250 is a soft detector, decoder 265 is a soft decoder, and iterative decoding is used, information may be fed from the decoder 265 back to the channel detector 250 using data link 260 so that the data may be iteratively processed to produce the recovered data 270.

Figure 3:
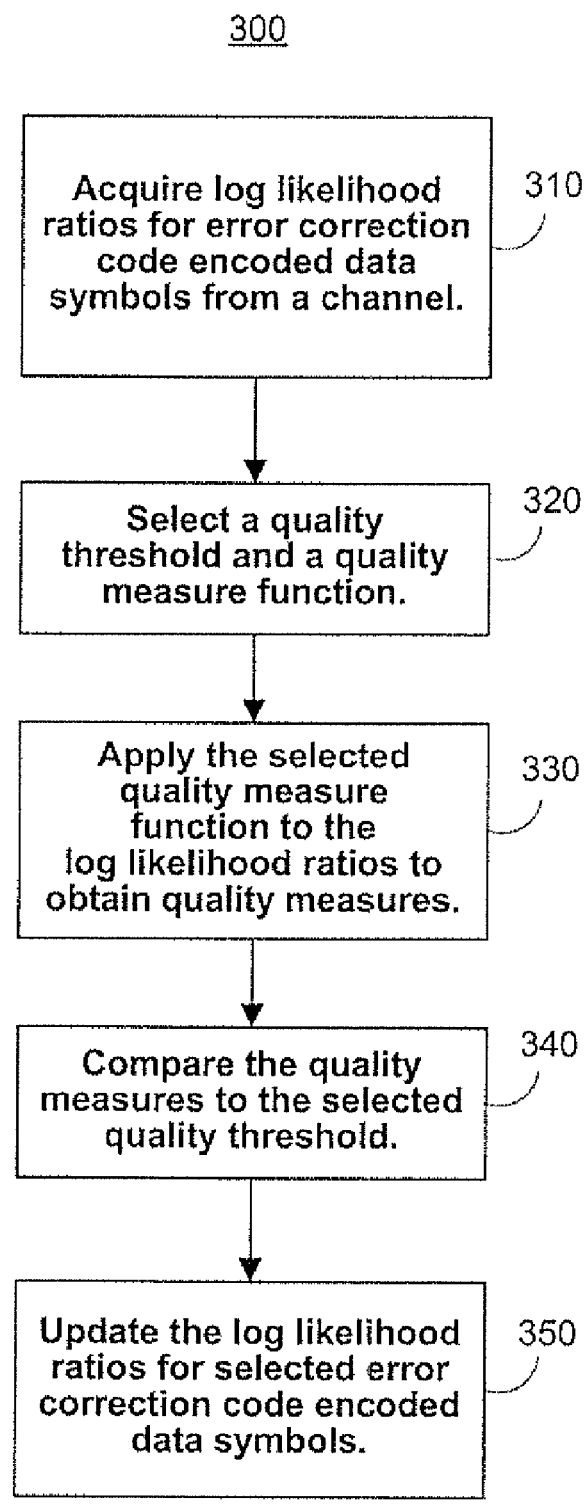
FIG. 3 is an illustrative process for enhancing the soft decoding/soft detection of data on asymmetric channels.

In embodiments where channel detector 250 is a soft detector, decoder 265 is a soft decoder, and channel 230 is an asymmetric channel, a method for enhancing the soft decoding/soft detection of data may be implemented in channel detector 250 and decoder 265. FIG. 3 is a flowchart illustrating such a process. Process 300 includes steps 310, 320, 330, 340, and 350. At step 310 log-likelihood ratios (LLRs) are acquired for error-correction code (ECC) encoded data symbols from a channel. The channel may be a communications channel or a data storage channel such as a holographic data storage channel. The ECC encoded data symbols may correspond to a data block of length N. The data block may correspond to encoded data 220 of communication/data storage system 200 shown in FIG. 2, while the LLRs may correspond to the channel detector input 245 or the channel detector output 255. $LLR(s_i)$ is hereinafter defined as the input LLR corresponding to the symbol $s_i$ in the data block of length N, where i ranges from one to N.

At step 320 a quality measure function and a quality threshold are selected. The quality measure function maps all LLR $(s_i)$ to values hereinafter known as quality measures. The quality measure function may be selected to be $LLR(s_i)$, a constant multiplied by $LLR(s_i)$, or any suitable function that has $LLR(s_i)$ as a parameter and outputs a real number.

The selection of the quality threshold may be dependent on the values of all $LLR(s_i)$ in the data block. For example, in determining the quality threshold where the encoded data 220 is binary, all $LLR(s_i)$ may be sorted into two distinct sets—a first set consisting of all $LLR(s_i)$ corresponding to encoded data 220 that were transmitted as the data symbol '0', and a second set consisting of all $LLR(s_i)$ corresponding to the encoded data 220 that were transmitted as the data symbol '1'. Due to the definition of log-likelihood ratio, a correct $LLR(s_i)$ in the first set corresponds to an $LLR(s_i)$ that is positive, while an incorrect $LLR(s_i)$ in the first set corresponds to an $LLR(s_i)$ that is negative. Consequently, a correct $LLR(s_i)$ in the second set corresponds to an $LLR(s_i)$ that is negative, while an incorrect $LLR(s_i)$ in the second set corresponds to an $LLR(s_i)$ that is positive.

In one embodiment, the distribution of the LLRs in each set are compared to determine the quality threshold. For example, the extreme ends, or tails of the distributions of LLRs in each set may be compared. Specifically, the positive LLRs in each set may be compared. If the positive LLRs in the first set are greater in magnitude than the LLRs in the second set, the quality threshold may be selected as the positive LLR value with the greatest magnitude in the second set. Conversely, if the positive LLRs in the second set are greater in magnitude than the LLRs in the first set, the quality threshold may be selected as the positive LLR with in the first set with the greatest magnitude. Alternatively, the most negative LLRs in each set may be compared. If the negative LLRs in the first set are greater in magnitude than the LLRs in the second set, the quality threshold may be selected as the negative LLR in the second set with the greatest magnitude. Conversely, if the negative LLRs in the second set are greater in magnitude than the LLRs in the first set, the quality threshold may be selected as the negative LLR in the first set with the greatest magnitude.

Which tails of LLRs are compared, and consequently the selected quality threshold, may depend on the proportion of LLRs in each set that are correct. For example, if there is a larger proportion of LLRs in the first set that are correct as compared to the proportion of LLRs in the second set that are correct, the positive LLRs that are greatest in magnitude may be compared. Alternatively, if there is a larger proportion of LLRs that are correct in the second set that are correct as compared to the proportion of LLRs in the first set that are correct, the negative LLRs that are greatest in magnitude may be compared. These choices are made to ensure that only correct LLRs are updated in the final step of the method, which will be described below.

At step 330, the selected quality measure function is applied to all $LLR(s_i)$ to obtain a set of quality measures. At step 340, the quality measures are compared to the selected quality threshold. In one embodiment in which the quality threshold is positive, all $LLR(s_i)$ are compared to the selected quality threshold to determine which LLRs are greater than the selected quality threshold. In another embodiment in which the quality threshold is negative, all $LLR(s_i)$ are compared to the selected quality threshold to determine which LLRs are less than the selected quality threshold.

At step 350, the LLRs for selected ECC encoded data symbols are updated. The selected LLRs may be updated with a modification function. The modification function may consist of the LLR multiplied by a selected scaling factor. The scaling factor may be selected based on the distribution of the $LLR(s_i)$. Alternatively, the scaling factor may be selected based on the results of the comparisons of the quality measures to the selected quality threshold. In embodiments where the selected quality threshold is positive, all LLRs which are greater than the selected quality threshold may be selected to be updated at step 350. The selected LLRs may be multiplied by a scaling factor that is greater than one—i.e. a scaling factor that causes the magnitude of the selected LLRs to increase. Alternatively, all LLRs which are less than the selected quality threshold may be selected to be updated at step 350. The selected LLRs may be multiplied by a scaling factor that is between zero and one—i.e. a scaling factor that causes the magnitude of the selected LLRs to decrease. Alternatively, all $LLR(s_i)$ may be selected to be updated at step 350 by multiplying all LLRs which are greater than the selected quality threshold by a first scaling factor that is greater than one, and by multiplying all LLRs which are less than the selected quality threshold by a second scaling factor that is between zero and one.

In embodiments where the selected quality threshold is negative, all LLRs which are less than the selected quality threshold may be selected to be updated at step 350. The selected LLRs may be multiplied by a scaling factor that is greater than one—i.e. a scaling factor that causes the magnitude of the selected LLRs to increase. Alternatively, all LLRs which are greater than the selected quality threshold may be selected to be updated at step 350. The selected LLRs may be multiplied by a scaling factor that is between zero and one—i.e. a scaling factor that causes the magnitude of the selected LLRs to decrease. Alternatively, all $LLR(s_i)$ may be selected to be updated at step 350 by multiplying all LLRs which are less than the selected quality threshold by a first scaling factor that is greater than one, and by multiplying all LLRs which are greater than the selected quality threshold by a second scaling factor that is between zero and one.

Decoder 265 may use some or all of the updated LLRs to decode the encoded data 220 of communication/data storage system 200 shown in FIG. 2. The decoded data may then be output as recovered data 270. Recovered data 270 may contain a reduced number of errors due to the use of the one or more the techniques described with respect to illustrative process 300 of FIG. 3

Figure 4:
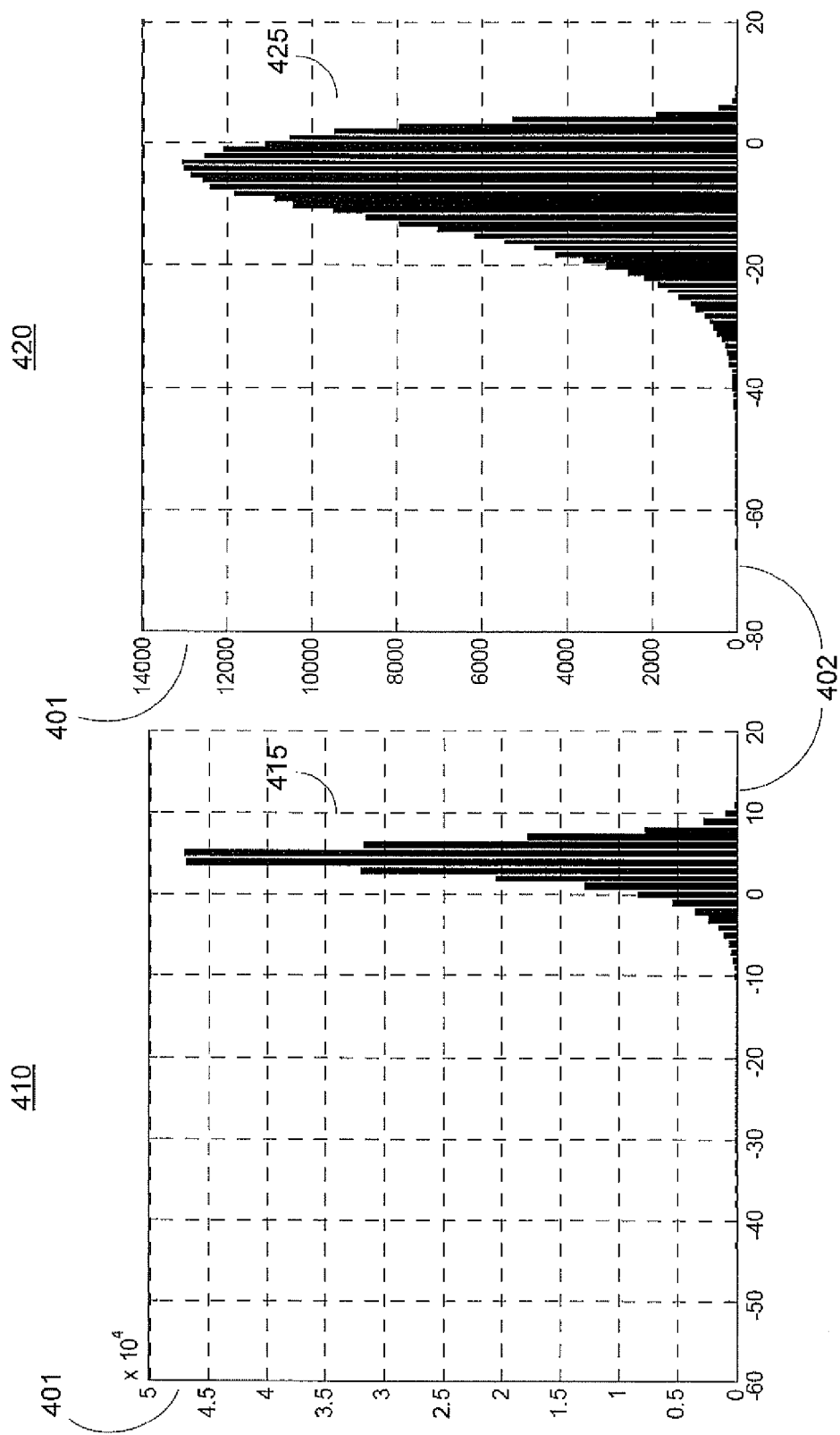
FIG. 4 shows an illustrative histogram of LLRs obtained from a binary holographic storage channel.

FIG. 4 shows illustrative histograms 410 and 420 of LLRs obtained from a binary holographic data storage channel. The holographic storage channel is part of a communications/data storage system which uses iterative soft decoding of LDPC codes. All $LLR(s_i)$ have been sorted into two distinct sets—a first set 415 consisting of all $LLR(s_1)$ corresponding to encoded data symbols that were transmitted as the data symbol '0', and a second set 425 consisting of all $LLR(s_i)$ corresponding to the encoded data symbols that were transmitted as the data symbol '1'. Histogram 410 displays the value of the LLRs on the x-axis 402, and the quantity of the LLRs on the y-axis 401. Due to the definition of log-likelihood ratio, the correct LLRs in histogram 410 are those that are positive, while the incorrect LLRs are those that are negative. Similarly, histogram 420 displays the value of the LLRs on the x-axis 402, and the quantity of the LLRs on the y-axis 401. The correct LLRs in histogram 420 are those that are negative, while the incorrect LLRs are those that are positive. Note that there are significantly more correct LLRs in the first set 415 than there are in the second set 425.

The LLRs depicted in histograms 410 and 420 may be enhanced according to one or more the techniques described with respect to illustrative process 300 of FIG. 3. The enhancements are proposed specifically due to the asymmetry of the channel from which the LLRs were obtained. Hereinafter LLRs in the right tail may be defined as the positive LLRs of greatest magnitude, while LLRs in the left tail may be defined as the negative LLRs of greatest magnitude. It may be observed that the LLRs in the right tail of the second set of LLRs 425 of histogram 420 die out, or end, earlier than the right tail of the first set of LLRs 415 of histogram 410. Because iterative decoders may favor an initial set of LLRs that are correct and have a large magnitude, a positive quality threshold is selected. The quality threshold may be selected to be 3.5, or the approximate value where the LLRs in the second set 425 die out. The quality measure function may be selected to be $LLR(s_i)$, and thus the quality measures will be equal to the $LLR(s_i)$. All $LLR(s_i)$ may be compared to the selected quality threshold to determine whether they are greater than the selected quality threshold. If the value for a particular $LLR(s_i)$ exceeds the selected quality threshold, the particular $LLR(s_i)$ is updated. The updating may be performed by applying a modification function to the $LLR(s_i)$. As mentioned earlier, because it is desirable to scale up the magnitude of the correct LLRs for the benefit of an iterative decoder, the modification function is selected to be the LLR multiplied by a scaling factor. For the LLRs depicted in histograms 410 and 420, the scaling factor may be selected to be 1.5.

Figure 5:
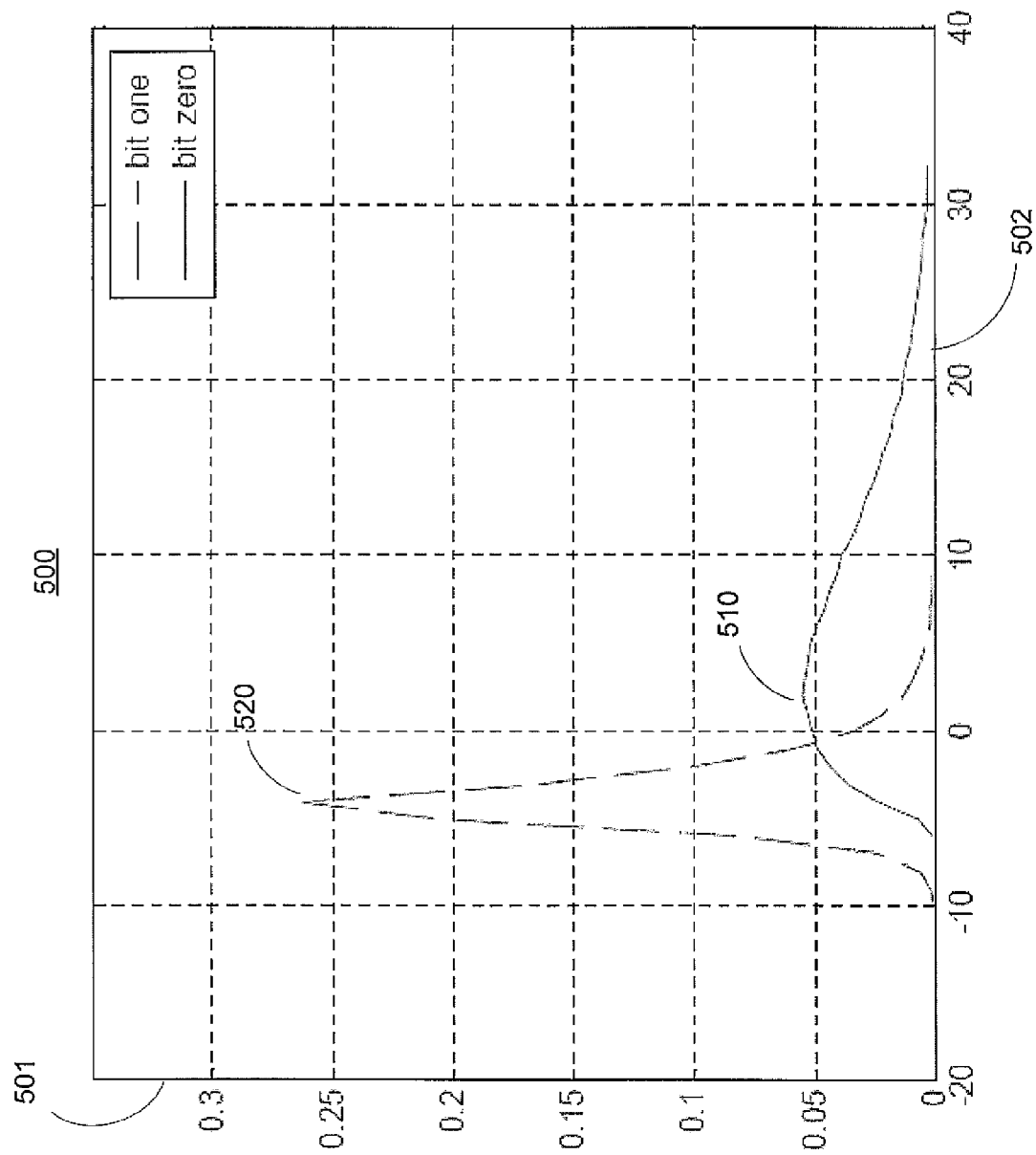
FIG. 5 shows an additional illustrative histogram of LLRs obtained from a binary holographic storage channel.

FIG. 5 shows illustrative histogram 500 depicting an additional set of LLRs obtained from a binary holographic data storage channel. The holographic storage channel is part of a communications/data storage system which uses iterative soft decoding of LDPC codes. Again, all $LLR(s_i)$ have been sorted into two distinct sets—a first set 510 consisting of all $LLR(s_i)$ corresponding to encoded data symbols that were transmitted as the data symbol '0', and a second set 520 consisting of all $LLR(s_i)$ corresponding to the encoded data symbols that were transmitted as the data symbol '1'. Histogram 500 displays the value of the LLRs on the x-axis 502, and the relative frequency of the LLRs on the y-axis 501. Due to the definition of log-likelihood ratio, the correct LLRs in first set 510 are those that are positive, while the incorrect LLRs are those that are negative. The correct LLRs in the second set 520 are those that are negative, while the incorrect LLRs are those that are positive. Note that there are significantly more correct LLRs in the second set 520 than there are in the first set 510.

The LLRs depicted in histogram 500 may be enhanced according to the one or more of the techniques described with respect to illustrative process 300 of FIG. 3. The enhancements are proposed specifically due to the asymmetry of the channel from which the LLRs were obtained. It may be observed that the LLRs in the left tail of the first set of LLRs 510 die out earlier than the left tail of the second set of LLRs 520. Because iterative decoders may favor an initial set of LLRs that are correct and have a large magnitude, a negative quality threshold is selected. The quality threshold may be selected to be, for example, −5, or the approximate value where the LLRs in the first set 510 die out. The quality measure function may be selected to be $LLR(s_i)$, and thus the quality measures will be equal to the $LLR(s_i)$. All $LLR(s_i)$ may be compared to the selected quality threshold to determine whether they are less than the selected quality threshold. If the value for a particular $LLR(s_i)$ is less than the selected quality threshold, the particular $LLR(s_i)$ is updated. The updating may be performed by applying a modification function to the $LLR(s_i)$. As mentioned earlier, because it is desirable to scale up the magnitude of the correct LLRs for the benefit of an iterative decoder, the modification function is selected to be the LLR multiplied by a scaling factor. For the LLRs depicted in histogram 500, the scaling factor may be selected to be, for example, 1.5.

Referring now to FIGS. 6A-6G, various exemplary implementations of the present invention are shown.

Figure 6A:
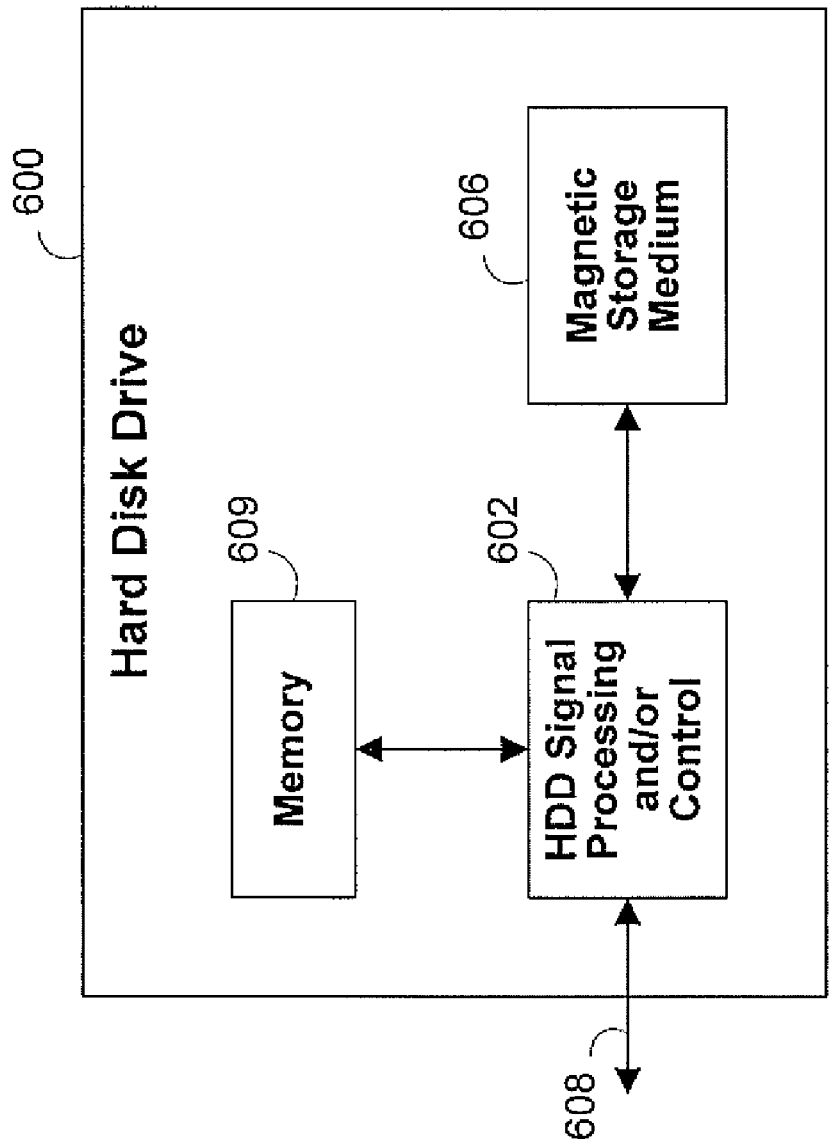
FIG. 6A is an block diagram of an exemplary hard disk drive that can employ the disclosed technology.

Referring now to FIG. 6A, the present invention can be implemented in a hard disk drive 1000. The present invention may implement either or both signal processing and/or control circuits, which are generally identified in FIG. 6A at 1002. In some implementations, the signal processing and/or control circuit 1002 and/or other circuits (not shown) in the HDD 1000 may process data, perform coding and/or encryption, perform calculations, and/or format data that is output to and/or received from a magnetic storage medium 1006.

The HDD 1000 may communicate with a host device (not shown) such as a computer, mobile computing devices such as personal digital assistants, cellular phones, media or MP3 players and the like, and/or other devices via one or more wired or wireless communication links 1008. The HDD 1000 may be connected to memory 1009 such as random access memory (RAM), low latency nonvolatile memory such as flash memory, read only memory (ROM) and/or other suitable electronic data storage.

Figure 6B:
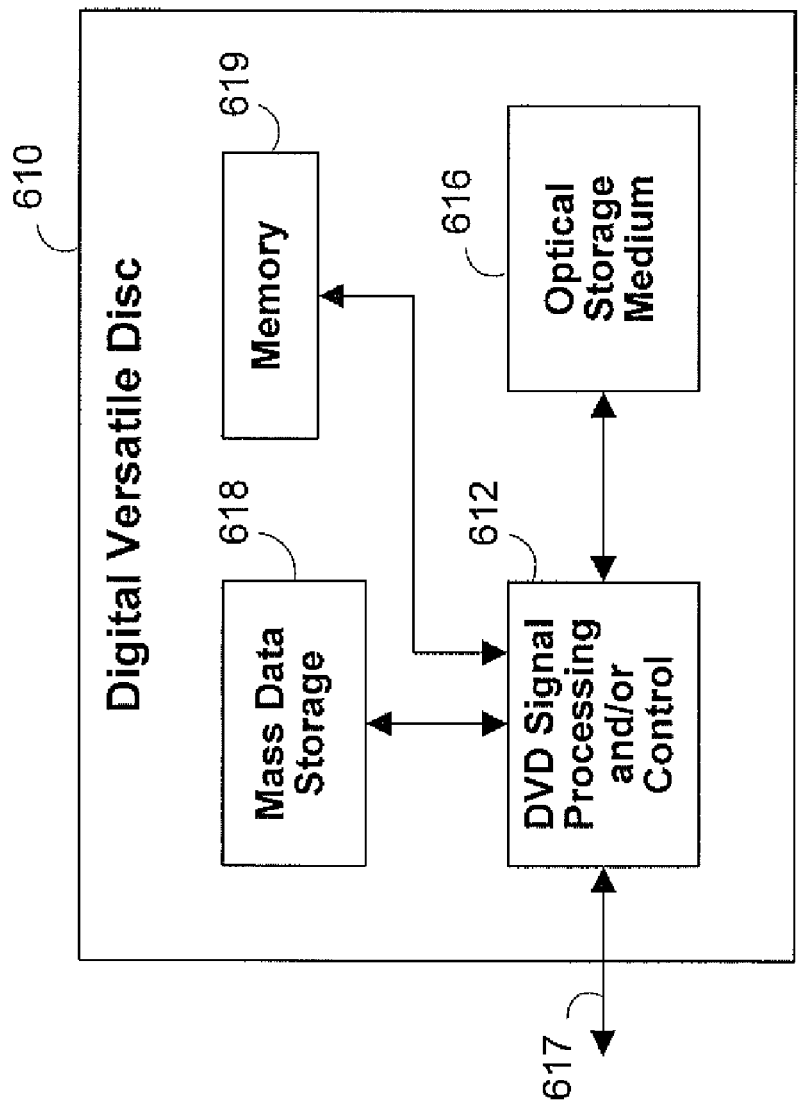
FIG. 6B is a block diagram of an exemplary digital versatile disc that can employ the disclosed technology.

Referring now to FIG. 6B, the present invention can be implemented in a digital versatile disc (DVD) drive 1010. The present invention may implement either or both signal processing and/or control circuits, which are generally identified in FIG. 6B at 1012, and/or mass data storage of the DVD drive 1010. The signal processing and/or control circuit 1012 and/or other circuits (not shown) in the DVD 1010 may process data, perform coding and/or encryption, perform calculations, and/or format data that is read from and/or data written to an optical storage medium 1016. In some implementations, the signal processing and/or control circuit 1012 and/or other circuits (not shown) in the DVD 1010 can also perform other functions such as encoding and/or decoding and/or any other signal processing functions associated with a DVD drive.

The DVD drive 1010 may communicate with an output device (not shown) such as a computer, television or other device via one or more wired or wireless communication links 1017. The DVD 1010 may communicate with mass data storage 1018 that stores data in a nonvolatile manner. The mass data storage 1018 may include a hard disk drive (HDD). The HDD may have the configuration shown in FIG. 6A. The HDD may be a mini HDD that includes one or more platters having a diameter that is smaller than approximately 1.8". The DVD 1010 may be connected to memory 1019 such as RAM, ROM, low latency nonvolatile memory such as flash memory and/or other suitable electronic data storage.

Figure 6C:
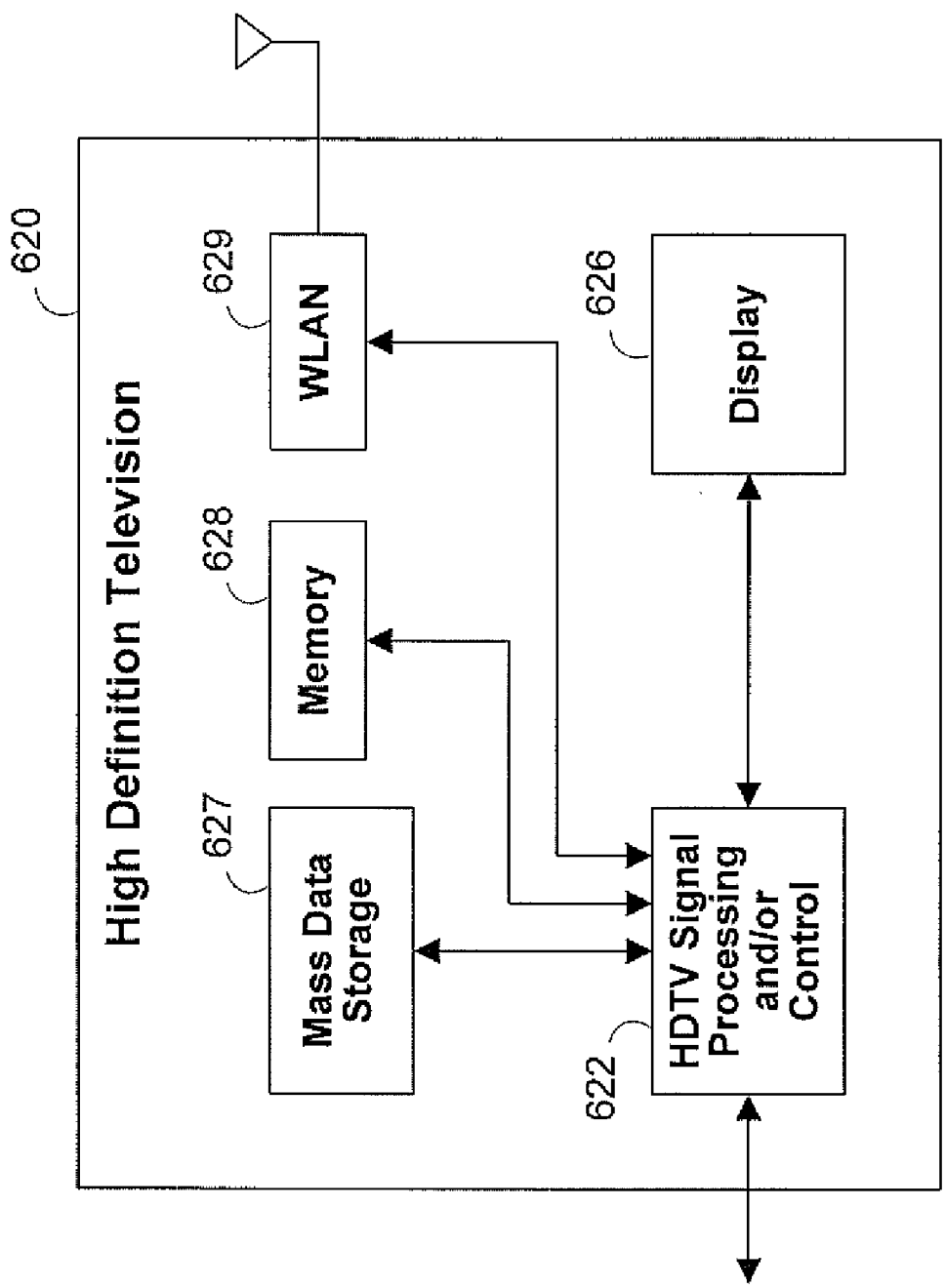
FIG. 6C is a block diagram of an exemplary high definition television that can employ the disclosed technology.

Referring now to FIG. 6C, the present invention can be implemented in a high definition television (HDTV) 1020. The present invention may implement either or both signal processing and/or control circuits, which are generally identified in FIG. 6C at 1022, a WLAN interface and/or mass data storage of the HDTV 1020. The HDTV 1020 receives HDTV input signals in either a wired or wireless format and generates HDTV output signals for a display 1026. In some implementations, signal processing circuit and/or control circuit 1022 and/or other circuits (not shown) of the HDTV 1020 may process data, perform coding and/or encryption, perform calculations, format data and/or perform any other type of HDTV processing that may be required.

The HDTV 1020 may communicate with mass data storage 1027 that stores data in a nonvolatile manner such as optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The HDTV 1020 may be connected to memory 1028 such as RAM, ROM, low latency nonvolatile memory such as flash memory and/or other suitable electronic data storage. The HDTV 1020 also may support connections with a WLAN via a WLAN network interface 1029.

Figure 6D:
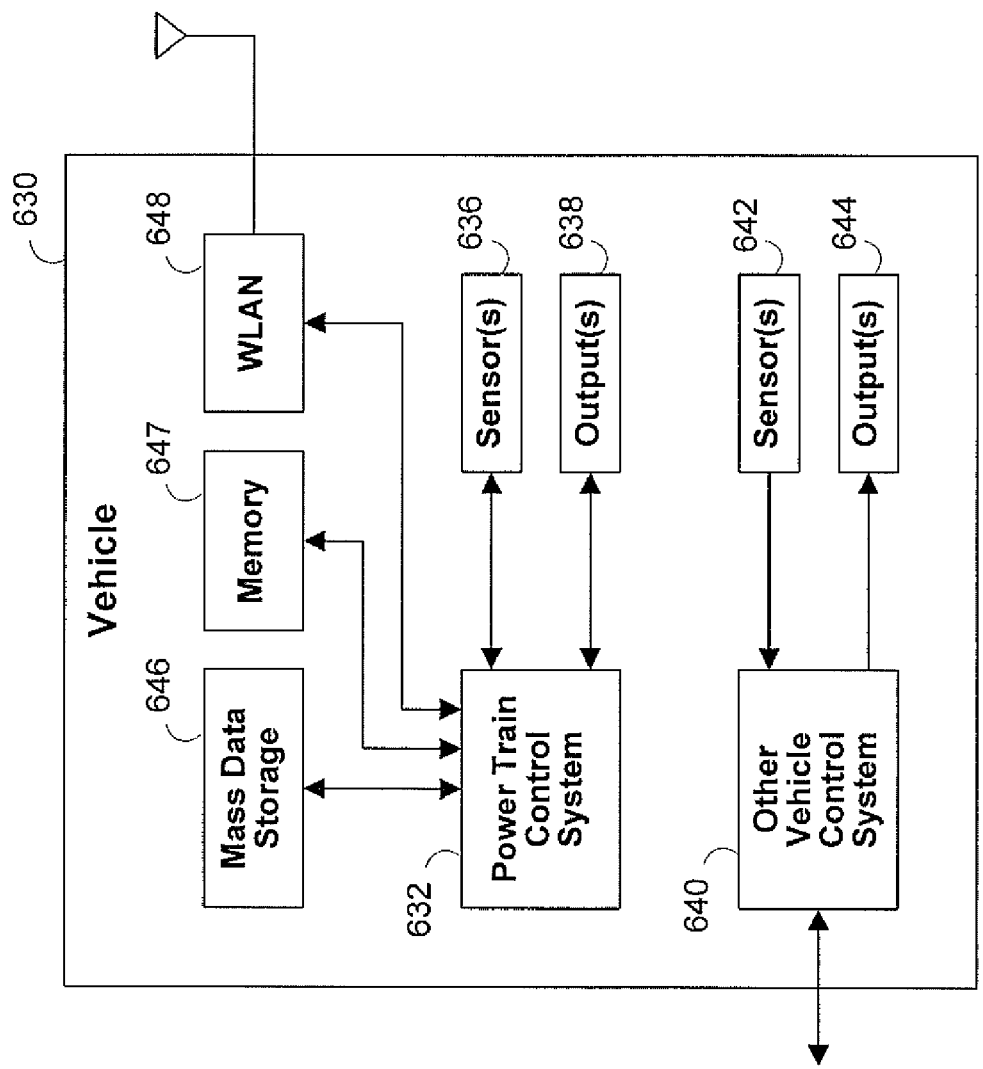
FIG. 6D is a block diagram of an exemplary vehicle that can employ the disclosed technology.

Referring now to FIG. 6D, the present invention implements a control system of a vehicle 1030, a WLAN interface and/or mass data storage of the vehicle control system. In some implementations, the present invention may implement a powertrain control system 1032 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1040 of the vehicle 1030. The control system 1040 may likewise receive signals from input sensors 1042 and/or output control signals to one or more output devices 1044. In some implementations, the control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1032 may communicate with mass data storage 1046 that stores data in a nonvolatile manner. The mass data storage 1046 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The powertrain control system 1032 may be connected to memory 1047 such as RAM, ROM, low latency nonvolatile memory such as flash memory and/or other suitable electronic data storage. The powertrain control system 1032 also may support connections with a WLAN via a WLAN network interface 1048. The control system 1040 may also include mass data storage, memory and/or a WLAN interface (all not shown).

Figure 6E:
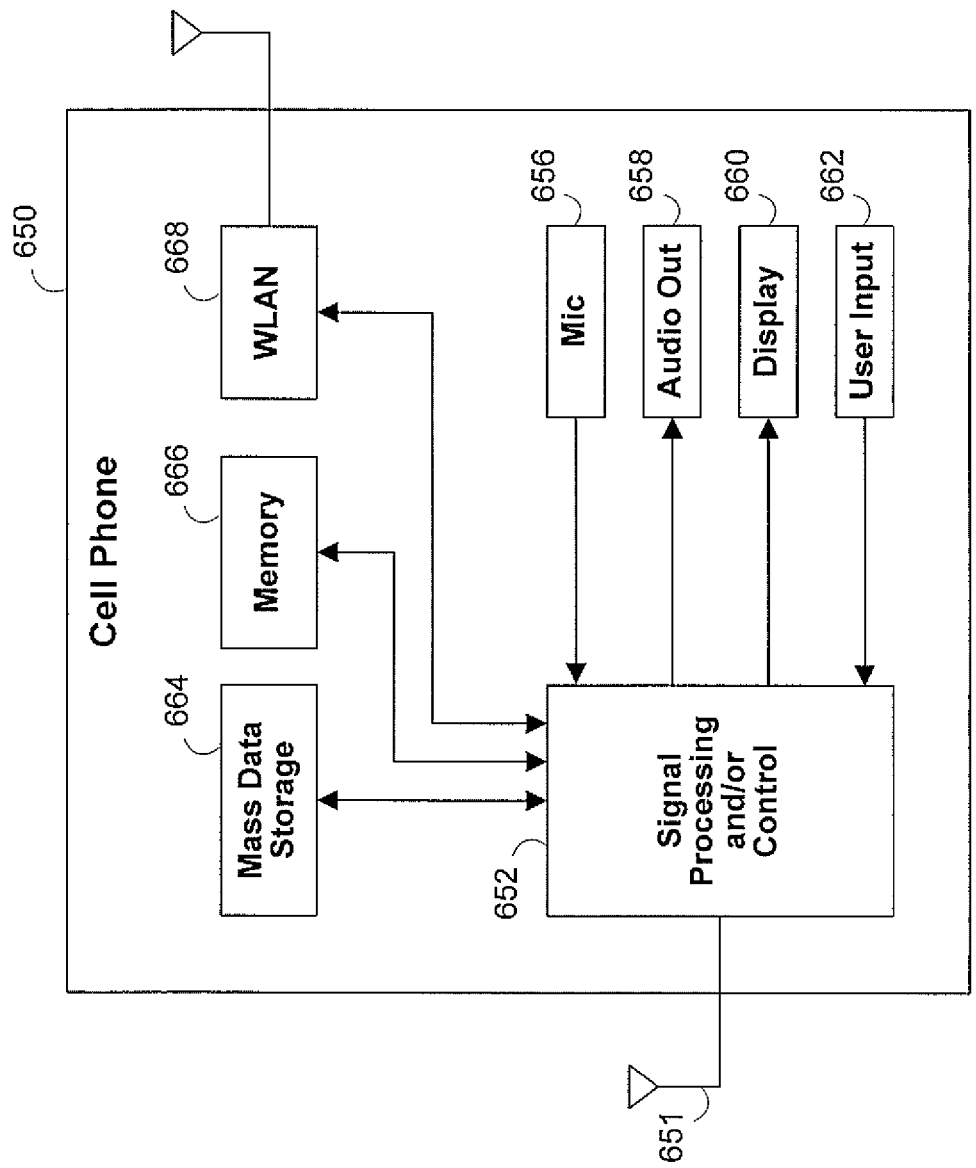
FIG. 6E is a block diagram of an exemplary cell phone that can employ the disclosed technology.

Referring now to FIG. 6E, the present invention can be implemented in a cellular phone 1050 that may include a cellular antenna 1051. The present invention may implement either or both signal processing and/or control circuits, which are generally identified in FIG. 6E at 1052, a WLAN interface and/or mass data storage of the cellular phone 1050. In some implementations, the cellular phone 1050 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular phone 1050 may process data, perform coding and/or encryption, perform calculations, format data and/or perform other cellular phone functions.

The cellular phone 1050 may communicate with mass data storage 1064 that stores data in a nonvolatile manner such as optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The cellular phone 1050 may be connected to memory 1066 such as RAM, ROM, low latency nonvolatile memory such as flash memory and/or other suitable electronic data storage. The cellular phone 1050 also may support connections with a WLAN via a WLAN network interface 1068.

Figure 6F:
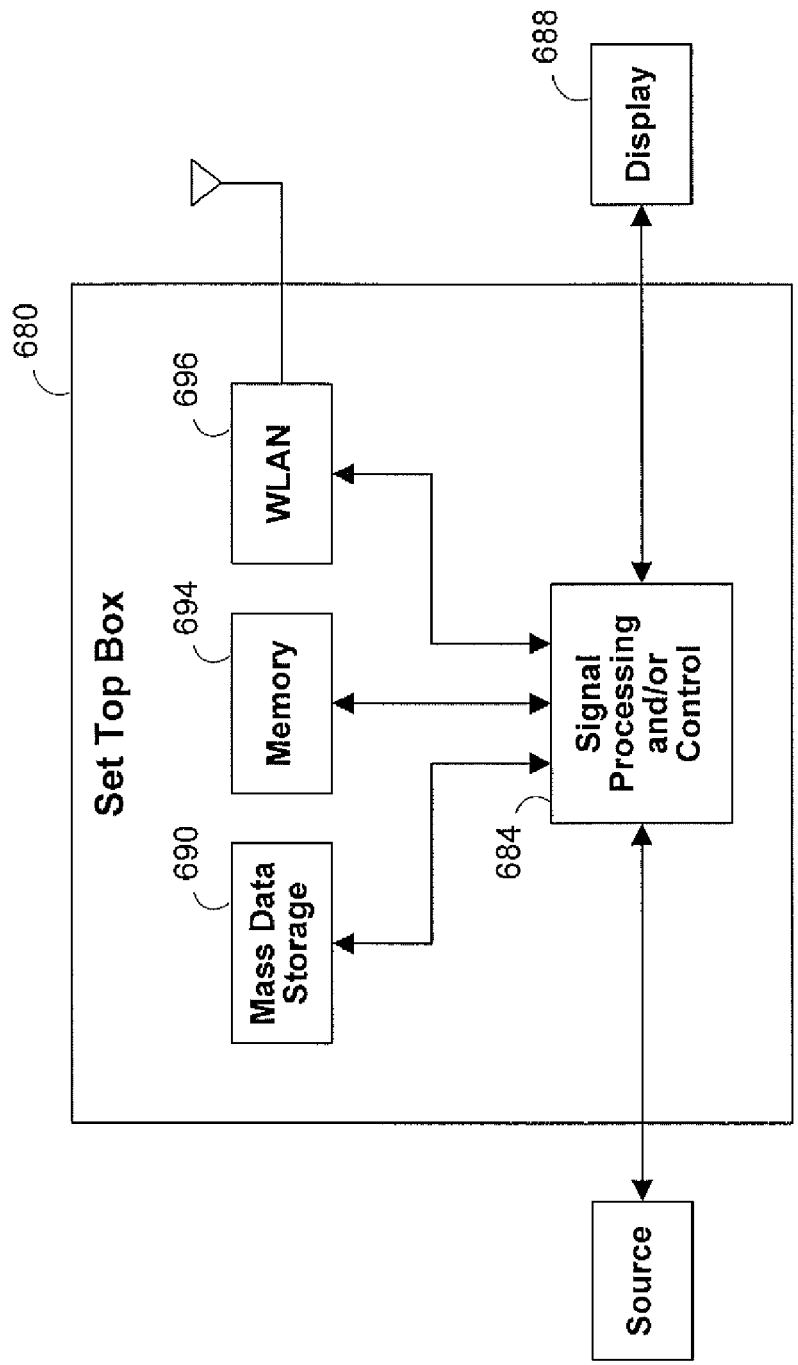
FIG. 6F is a block diagram of an exemplary set top box that can employ the disclosed technology.

Referring now to FIG. 6F, the present invention can be implemented in a set top box 1080. The present invention may implement either or both signal processing and/or control circuits, which are generally identified in FIG. 6F at 1084, a WLAN interface and/or mass data storage of the set top box 1080. The set top box 1080 receives signals from a source such as a broadband source and outputs standard and/or high definition audio/video signals suitable for a display 1088 such as a television and/or monitor and/or other video and/or audio output devices. The signal processing and/or control circuits 1084 and/or other circuits (not shown) of the set top box 1080 may process data, perform coding and/or encryption, perform calculations, format data and/or perform any other set top box function.

The set top box 1080 may communicate with mass data storage 1090 that stores data in a nonvolatile manner. The mass data storage 1090 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The set top box 1080 may be connected to memory 1094 such as RAM, ROM, low latency nonvolatile memory such as flash memory and/or other suitable electronic data storage. The set top box 1080 also may support connections with a WLAN via a WLAN network interface 1096.

Figure 6G:
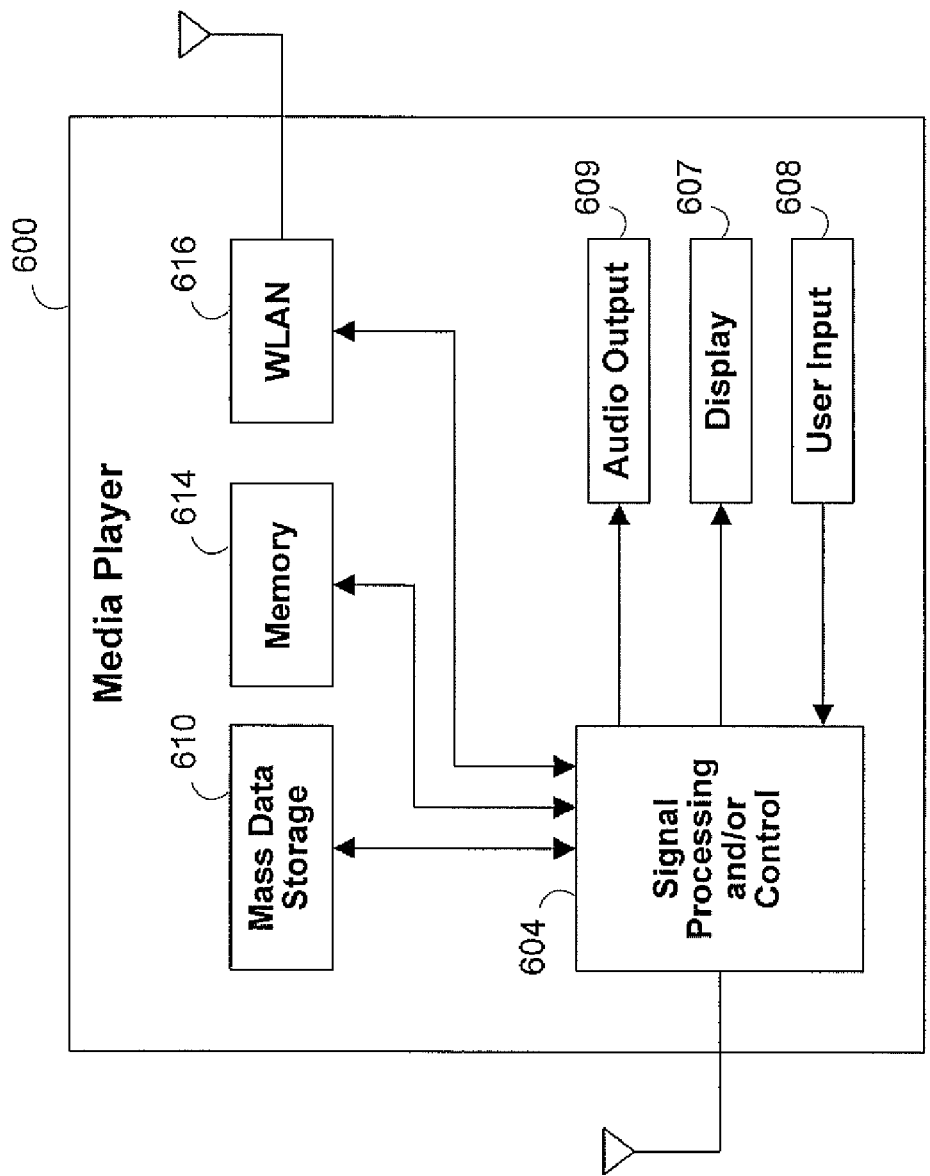
FIG. 6G is a block diagram of an exemplary media player that can employ the disclosed technology.

Referring now to FIG. 6G, the present invention can be implemented in a media player 1100. The present invention may implement either or both signal processing and/or control circuits, which are generally identified in FIG. 6G at 1104, a WLAN interface and/or mass data storage of the media player 1100. In some implementations, the media player 1100 includes a display 1107 and/or a user input 1108 such as a keypad, touchpad and the like. In some implementations, the media player 1100 may employ a graphical user interface (GUI) that typically employs menus, drop down menus, icons and/or a point-and-click interface via the display 1107 and/or user input 1108. The media player 1100 further includes an audio output 1109 such as a speaker and/or audio output jack. The signal processing and/or control circuits 1104 and/or other circuits (not shown) of the media player 1100 may process data, perform coding and/or encryption, perform calculations, format data and/or perform any other media player function.

The media player 1100 may communicate with mass data storage 1110 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The media player 1100 may be connected to memory 1114 such as RAM, ROM, low latency nonvolatile memory such as flash memory and/or other suitable electronic data storage. The media player 1100 also may support connections with a WLAN via a WLAN network interface 1116. Still other implementations in addition to those described above are contemplated.

The foregoing describes systems and methods for enhancing soft decoders and detectors on asymmetric channels. One skilled in the art will appreciate that the invention can be practiced by other than the described embodiments, which are presented for purposes of illustration and not of limitation, and the present invention is limited only by the claims that follow.

What is claimed is:

1. A method for soft decoding data, the method comprising:
    acquiring from a channel by a demodulator soft information for a plurality of error-correction code (ECC) encoded data symbols;
    selecting by a channel detector/decoder pair a quality measure function and a quality threshold based, at least in part, on the soft information;
    applying the selected quality measure function to the soft information to obtain quality measures;
    comparing the quality measures to the selected quality threshold; and
    updating the soft information for selected ECC encoded data symbols based on the comparisons.

2. The method of claim 1, wherein the ECC encoded data symbols are represented in binary, and wherein selecting the quality threshold further comprises:
    determining a first portion of the soft information corresponding to data symbol '0';
    determining a second portion of the soft information corresponding to data symbol '1'; and
    selecting the quality threshold based, at least in part, on a distribution of the soft information in the first and second portions.

3. The method of claim 1, wherein the ECC encoded data symbols are represented in binary, and wherein selecting the quality threshold further comprises:
    determining a first portion of the soft information corresponding to data symbol '0';
    determining a second portion of the soft information corresponding to data symbol '1';
    determining a first proportion based on the soft information in the first portion that is positive;
    determining a second proportion based on the soft information in the second portion that is negative; and
    selecting the quality threshold based, at least in part, on comparing the first and second proportions.

4. The method of claim 1, wherein the selected quality threshold is negative and comparing the quality measures to the selected quality threshold further comprises determining whether the quality measures are less than the selected quality threshold.

5. The method of claim 1, wherein the selected quality measure is positive and comparing the quality measures to the selected quality threshold further comprises determining whether the quality measures are greater than the selected quality threshold.

6. The method of claim 1, further comprising:
    decoding the ECC encoded data symbols based, at least in part, on the updated soft information; and
    outputting decoded data symbols.

7. The method of claim 1, wherein the selected quality threshold is positive, and updating the soft information for selected ECC encoded data symbols further comprises applying a modification function to the soft information which are greater than a scaling factor.

8. The method of claim 7, wherein the modification function comprises multiplying the soft information by the scaling factor, wherein the scaling factor is greater than one.

9. The method of claim 1, wherein the selected quality threshold is negative, and updating the soft information for selected ECC encoded data symbols further comprises applying a modification function to the soft information which are less than a scaling factor.

10. The method of claim 9, wherein the modification function comprises multiplying the soft information by the scaling factor, wherein the scaling factor is greater than one.

11. A system for soft decoding data, the system comprising:
- an encoder to encode a plurality of error-correction code (ECC) encoded data symbols;
- a digital modulator to transmit the ECC encoded data symbols over a channel;
- a demodulator to receive the plurality of ECC encoded data symbols and acquiring soft information for the plurality of ECC encoded data symbols; and
- a channel detector/decoder pair configured to:
  - select a quality measure function and a quality threshold based, at least in part, on the soft information;
  - apply the selected quality measure function to the soft information to obtain quality measures;
  - compare the quality measures to the selected quality threshold; and
  - update the soft information for selected ECC encoded data symbols based on the comparisons.

12. The system of claim 11, wherein the ECC encoded data symbols are represented in binary, and the channel detector/decoder pair is further configured to:
- determine a first portion of the soft information corresponding to data symbol '0';
- determine a second portion of the soft information corresponding to data symbol '1'; and
- select the quality threshold based, at least in part, on a distribution of the soft information in the first and second portions.

13. The system of claim 11, wherein the ECC encoded data symbols are represented in binary, and the channel detector/decoder pair is further configured to:
- determine a first portion of the soft information corresponding to data symbol '0';
- determine a second portion of the soft information corresponding to data symbol '1';
- determine a first proportion based on the soft information in the first portion that is positive;
- determine a second proportion based on the soft information in the second portion that is negative; and
- select the quality threshold based, at least in part, on comparing the first and second proportions.

14. The system of claim 11, wherein the selected quality threshold is negative and the channel detector/decoder pair is further configured to compare the quality measures to the selected quality threshold further by determining whether the quality measures are less than the selected quality threshold.

15. The system of claim 11, wherein the selected quality measure is positive and the channel detector/decoder pair is further configured to compare the quality measures to the selected quality threshold further by determining whether the quality measures are greater than the selected quality threshold.

16. The system of claim 11, wherein the detector/decoder pair is further configured to:
- decode the ECC encoded data symbols based, at least in part, on the updated soft information; and
- output decoded data symbols.

17. The system of claim 11, wherein the selected quality threshold is positive, and the channel detector/decoder pair is further configured to update the soft information for selected ECC encoded data symbols by applying a modification function to the soft information which are greater than a scaling factor.

18. The method of claim 17, wherein the modification function comprises multiplying the soft information by the scaling factor, wherein the scaling factor is greater than one.

19. The system of claim 11, wherein the selected quality threshold is negative, and the channel detector/decoder pair is further configured to update the soft information for selected ECC encoded data symbols by applying a modification function to the soft information which are less than a scaling factor.

20. The system of claim 19, wherein the modification function comprises multiplying the soft information by a scaling factor, wherein the scaling factor is greater than one.

* * * * *